Oct. 6, 1970             G. MATHES             3,532,316

FASTENING ELEMENT FOR ADHESIVE BONDING TO A SUPPORT

Filed April 4, 1967             5 Sheets-Sheet 1

INVENTOR.
GÜNTHER MATHES

BY

McGlew & Toren
ATTORNEYS

INVENTOR.
GÜNTHER MATHES
BY
McGlew & Toren
ATTORNEYS

Oct. 6, 1970 G. MATHES 3,532,316
FASTENING ELEMENT FOR ADHESIVE BONDING TO A SUPPORT
Filed April 4, 1967 5 Sheets-Sheet 3

INVENTOR.
GÜNTHER MATHES
BY
McGlew & Toren
ATTORNEYS

Oct. 6, 1970   G. MATHES   3,532,316
FASTENING ELEMENT FOR ADHESIVE BONDING TO A SUPPORT
Filed April 4, 1967   5 Sheets-Sheet 4

INVENTOR.
GÜNTHER MATHES
BY
McGlew & Toren
ATTORNEYS

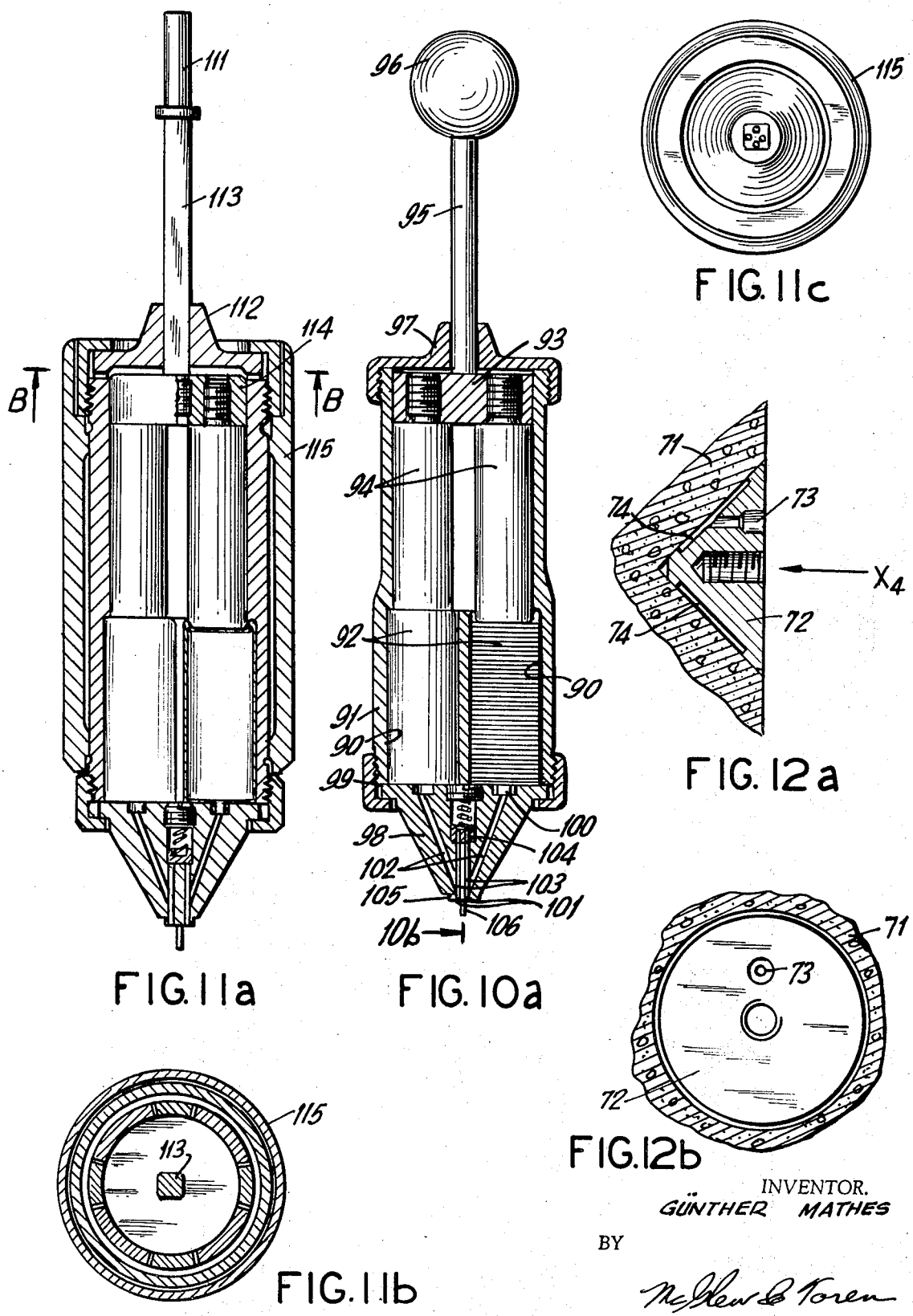

United States Patent Office 3,532,316
Patented Oct. 6, 1970

3,532,316
FASTENING ELEMENT FOR ADHESIVE BONDING TO A SUPPORT
Gunther Mathes, Nendeln, Liechtenstein, assignor to Hilti Aktiengesellschaft, Schaan, Liechtenstein
Filed Apr. 4, 1967, Ser. No. 628,358
Claims priority, application Germany, Apr. 5, 1966, H 59,027
Int. Cl. A47b 96/06; F16b 47/00
U.S. Cl. 248—205                                    6 Claims

ABSTRACT OF THE DISCLOSURE

A fastening element has a bonding recess in a surface which is to be joined to a support surface, and is formed with one or more injection apertures communicating with this recess for the introduction of the respective components of the adhesive mixture or for an introduction of an adhesive mixture from a mixing chamber. The latter is formed with a maze-type mixing passage and may be detachably connected with the fastening element at a break away connection, or may form part of the element. The mixing may be performed by a rotating mixing element, such as a worm in the mixing chamber, or the mixture or its components may be introduced into the bonding recess by two or more displaceable pistons operating in respective magazines containing the cartridges holding the components of the adhesive, each of these passages having a respective outlet communicating with injection orifices leading to the bonding recess. The relative cross sectional areas of the magazines and the pistons may correspond to the mixture ratio of the adhesive components.

BACKGROUND OF THE INVENTION

Adhesives are widely used in modern technology, not only for large area bonding, such as floor coverings and the like, but also for single or row or successive bonding of relatively small areas. While sufficient strength is readily attainable for large area bonding, difficulties are encountered in the case of the bonding of small areas, these difficulties being with respect to strength, stability and simplicity of production of the successive small area bondings. However, these small area bondings are also of considerable importance.

For example, such small area bondings are used in the building trade where, for various installations, a plurality of attachments is needed, which attachments, in their conventional manner of formation, are often inappropriate and unduly expensive. Also, a series of attachments, for example in the construction of apparatus, and which hitherto have been made by screws or rivets, can be produced more rationally by gluing, particularly in assembly line work. However, in order to produce single small area bonds and rows thereof satisfactorily, certain requirements, with respect to process, bonding material and apparatus, must be fulfilled.

One general requirement of such bonds is a high initial adhesion so as to secure the elements or parts to be joined in a secure manner as rapidly as possible after joining of the surfaces, in order to support the dead weight of elements or parts, particularly in the case of vertical suspended assemblies. Another requirement is that the adhesive must harden rapidly, in order to permit rapid formation of a plurality of small area bonds, or to release the equipment for other uses. The bonding method must be easy to use and must permit either single bondings or a series of bondings without any undesired interruptions and without special precautionary measures. A further requirement is that the fastening devices should be as simple, inexpensive and foolproof as possible, so that their bonding can be effected by unskilled labor.

Single component adhesives frequently cannot be used, despite their basically easy application, because of not having fully satisfactory properties or because the application methods are difficult and expensive. Furthermore, the use of conventional multi-component adhesives for such bonds will not always meet the requirements, in particular, because the progress of the individual bonds is too slow, such as too low an initial adhesion, and difficulties in forming a series of small area bonds because of limited pot time of the adhesives.

With known gluing methods using multi-component adhesives, a considerable pot time has been an absolute necessity since the components had to be mixed intimately by hand or mechanically before application thereof on the area to be glued. Then the finished mixture had to be applied on the surfaces to be glued, again by hand or by means of spray equipment. These time-consuming measures presupposed a relatively long pot time of the adhesive, and frequently special measures had to be taken to prolong pot time.

SUMMARY OF THE INVENTION

The invention relates to forming adhesive bonds and, more particularly, to a novel formation of such bonds in which the components of multi-component adhesives are mixed during application thereof to the areas to be bonded, and in which a fastening or anchoring element is provided with a gluing recess having one or more injection apertures communicating therewith for receiving either the adhesive mixture or its plural components, with the plural components, in the latter case, being mixed in the gluing recess.

It is true that multi-component adhesives must be subjected to mixing before application to surfaces to be bonded, but they have a number of properties which permit this as a practical procedure. In addition to their high strength and stability after hardening, they are substantially universally applicable if sufficient attention is paid to the pot time and the hardening time.

In accordance with the present invention, a multi-component adhesive is used for the production of adhesive or glue bonds, and particularly for small area bonds using devices whose surfaces to be bonded are formed with recesses for the formation of a glue joint. For example, such elements might be clips, hooks, and the like. A glue or adhesive mixture having a short pot time is used, and the preceding mixing operation for the solidification of the adhesive is performed in the pre-formed glue joint itself or in a mixing chamber communicating either directly or indirectly therewith through a short passage, with subsequent transfer of the mixed product into the pre-formed gluing recess. In this simple and economically advantageous manner, it is possible to bring about rapid effecting of the initial adhesion, and thus to provide the basic conditions for more rapid hardening.

In practicing the invention, both cold-hardening and hot-hardening adhesives are useable, with preference being given to cold-hardening adhesives. If the short pot time, and the rapid hardening presupposing a short pot time, are not already properties of the adhesive components on being mixed, the reaction times must be accelerated either by addition of accelerators or by the application of heat. However, not all types of adhesive are chemically so controllable, as cold-hardeners, that the short reaction times required in accordance with the invention can be attained. In such cases, a supply of heat is necessary.

If, as is frequently the case, a temperature rise of the area to be bonded is not possible, for various reasons, the heating is advantageously effected by bringing the individual components of the adhesive to solidification or hardening temperature immediately before their mixing or, respectively, before their introduction into the gluing recess. Thus, hot-hardening types of adhesive can be used successfully with the method of the invention.

In the invention, the mixing operation necessary for solidification of the adhesive is effected in the pre-formed gluing recess itself or in a mixing chamber communicating with the recess either directly or through a short passage, with subsequent transfer of the mixed adhesive into the gluing joint. In conjunction with a multi-component adhesive of short pot time, this insures the desired high initial adhesion and thus provides the condition for a rapid hardening, referred to the moment of mixing or introduction of the adhesive.

In a practical use of the invention a procedure which can be used frequently is that of bringing the adhesive components into the mixing zone, that is, either into the gluing recess itself or into the mixing chamber communicating therewith, from different respective cartridges having deformable and, in particular, elastic, enclosures and through separate passages in the required proportion.

In practicing the invention, fastening elements, such as clips, hooks, or similar securing elements, are used and have, on their base portions, gluing recesses serving for the formation of a glue joint when these elements are applied to a foundation or base to which they are to be bonded. The fastening elements are so designed as to have one or more injection apertures communicating with the gluing recess, for the introduction of the adhesive components or the mixed adhesive from the mixing chamber. If mixing of the adhesive is effected only in the gluing recess, different injection apertures or passages may be provided for the respective components of the adhesive mixture. In principle, of course, it is possible, even in such cases, that only one injection aperture is needed and with the components being introduced successively through this injection aperture into the gluing recess and mixed therein.

The mixing chamber may be integral with the fastening elements of the invention, or may be attached thereto through a connecting piece designed as a break away joint, although preferably the mixing chamber is detachably connected with the fastening element. Also, the mixing chamber may be designed with a maze-type or labyrinth mixing passage.

To obtain thorough mixing, the mixing chamber or the fastening elements may be provided with a rotating mixing element, such as a mixing worm in the gluing recess or in the mixing chamber. If the mixing chamber is detachably connected with the fastening element, a sealing construction is preferably provided in the zone of the outlet nozzle of the mixing passage and the zone of the adhesive injection aperture of the fastening element. It is thus possible to avoid, on transferring adhesive from the mixing chamber into the gluing recess, adhesive oozing out at the transition point.

In order to inject adhesive components into the mixing zone, such as into the gluing recess or the mixing chamber, the invention provides an injection sprayer having two or more pistons and respective magazines or cartridges containing the adhesive components and which are deformed by the pistons. The discharge passages from these magazines lead separately to the tip of the sprayer, from which the mixture is discharged into the fastening element. Preferably, the relative cross sectional areas of the maazines and pistons correspond to the volume mixture ratio of the adhesive components.

The cartridges used for performing the method of the invention advantageously have cases of elastic material, and the head portion of each cartridge is so designed that it will open under pressure. This can be provided by the arrangement of an adequate nozzle, by suitable selection of the material of the casing, or by sufficient reduction in the wall thickness of the casing. The bottom of the cartridge may be drawn inwardly to facilitate, in particular, its use in the aforementioned piston injection sprayers.

With the invention, the components of the adhesive can therefore be injected into the gluing recess in the correct mixture ratio, separately but simultaneously, and the mixing can be effected in the gluing recess. Alternatively, the mixing may be effected in the mixing chamber and delivered through a short passage into the gluing recess. In both instances, the critical phase due to the extreme reaction times of the adhesive, but inevitably in favor of a high initial adhesion, namely the period shortly after the preparation, is thus displaced into a zone in which the otherwise disadvantageous freezing of the mixture is utilized for the attainment of the desired bond. The control of extreme formulations of adhesives containing the multiple components is thus possible.

Attachments, for example, in the construction industry, have previously been produced almost exclusively by firing, driving or drilling during the assembly. However, in today's construction designs, there are elements, such as stratified or prestressed concrete, hard tile walls, and the like where the firing in of bolts or the drilling of fastening holes is undesirable or not possible at all. In these cases, the gluing technique is a meaningful additional assembly process. Furthermore, in light assembly techniques, such as used, for example, in electrical installations, the previous and heavier fastening methods are, in many cases, over-dimensioned as to strength and thereby result in an increased expenditure of material and working time.

An object of the invention is to provide an improved adhesive bonding procedure.

Another object of the invention is to provide an improved fastening element for use in an adhesive bonding procedure.

A further object of the invention is to provide such a fastening device in which the bond is effected by multi-component adhesives.

Still another object of the invention is to provide such a fastening device in which the components of the adhesive are mixed during their introduction to the area to be bonded.

A further object of the invention is to provide an improved device, of the type mentioned, including, in its surface to be bonded, a gluing recess communicating with one or more injection apertures for the supply of an adhesive mixture, or the supply of the components of the mixture, to the gluing recess.

Yet another object of the invention is to provide such a device including a mixing chamber communicating with such aperture or apertures and in which the components of the adhesive are thoroughly mixed as they are being introduced to the gluing recess.

A further object of the invention is to provide such a mixing chamber which is detachable from the fastening device.

Another object of the invention is to provide a fastening device in which the bonding is effected by a multi-component adhesive and in which the components of the adhesive are contained in respective deformable cartridges from which the individual components are expelled by piston means operating on the cartridges, with the individual components being then mixed and introduced into a gluing recess in the fastening element.

BRIEF DESCRIPTION OF THE DRAWINGS

For an understanding of the principles of the invention, reference is made to the following description of typical embodiments thereof as illustrated in the accompanying drawings.

In the drawings:

FIG. 1b is a plan view, partly in section, of the fastening element shown in FIG. 1a;

FIG. 2b is a development view of the mixing chamber shown in FIG. 2a;

FIG. 2c is a view taken on the line 2c—2c of FIG. 2a;

FIG. 2d is a bottom plan view of the fastening element shown in FIG. 2a;

FIG. 3b is a sectional view taken on the line A—A of FIG. 3a;

FIG. 3c is a bottom plan view of the fastening element shown in FIG. 3a;

FIG. 10a is a sectional view of an adhesive component injection device embodying the invention;

FIG. 10b is a sectional view looking in the direction of the arrow 10b of FIG. 10a;

FIG. 11a is a longitudinal sectional view of another form of adhesive mixing and injecting device embodying the invention;

FIG. 11b is a sectional view taken on the line B—B of FIG. 11a;

FIG. 11c is an end elevation view of the device shown in FIG. 11a;

FIG. 12a is a sectional view illustrating the anchoring of an attachment device, embodying the invention, to a concrete structure; and FIG. 12b is an elevation view looking in the direction of the arrow X₄ of FIG. 12a.

DESCRIPTION OF THE PREFERRED EMBODIMENTS

Figure 1A:
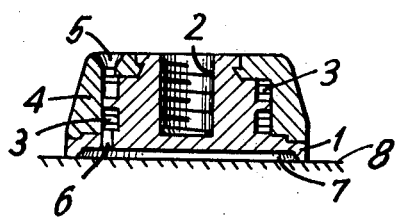
FIG. 1a is a cross sectional view through a fastening element embodying the invention.
Figure 1B:
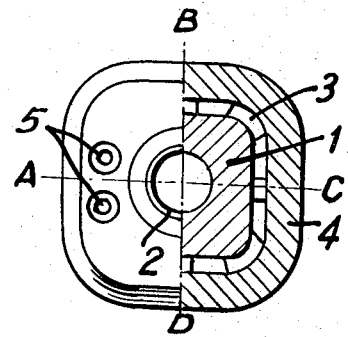
Figure 1C:
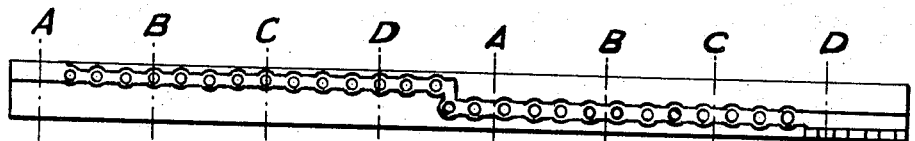
FIG. 1c is a development view corresponding to FIG. 1b.

Referring first to FIGS. 1a–1c, the fastening element shown therein includes a base body 1 having attachment means in the form of a threaded central recess 2. Base body 1 is formed peripherally with a maze-type or labyrinth mixing passage 3 shown in development in FIG. 1c, and passage 3 is closed exteriorly by a covering cap 4. In a bonding operation, two separate adhesive components are injected by a sprayer into respective inlet or injection apertures 5 and flow, while simultaneously being mixed, through the mixing passage 3 and the outlet apertures 6 into a gluing recess 7 in the surface of base body 1 to be bonded to a support 8. Recess 7 defines, with the surface of support 8, an adhesive-receiving and bond-enclosing chamber. When using a type of adhesive which possesses a sufficient initial adhesion to retain the fastening element secured to surface 1, the sprayer can be removed from the fastening element immediately after filling of the recess 7 and the next bonding can be effected. If load is to be applied after a short time, the hardening time should be adjusted accordingly.

FIGS. 2a–2d illustrate a fastening element having a mixing chamber connected thereto. This fastening element includes a base body 11 having a threaded central aperture 12 and having its bonding surface formed with a gluing recess 19. A mixing chamber 14 is connected to the base body 11 at an easily breakable zone 13, and an insert 15 in mixing chamber 14 provides a maze-type or labyrinth mixing passage 16 which is shown in development in FIG. 2b.

In this embodiment of the invention, two components of an adhesive are injected into inlet aperture 17 separately and from a corresponding device, during the bonding operation. After passing through the mixing passage 16, the now mixed adhesive components enter through outlet aperture 18 into gluing recess 19, filling the latter. Furthermore, in this embodiment, base body 11 is provided in its gluing recess 19 with strips 10, as shown in FIG. 2d, for better anchoring of the base body in the adhesive. After bonding, or hardening, of the adhesive, mixing chamber 14, including insert 15, is broken away at the breaking zone 13 and may be discarded. The arrangement shown in FIGS. 2a–2d has the advantage, as compared with that shown in FIGS. 1a–1c, that no unmixed adhesive components soil the fastening element.

FIGS. 3a–3d show a fastening element designed as a cable clip and having a mixing chamber connected thereto. Thus, base body 21 has a mixing chamber 23 connected thereto through a weakened break-away zone 22, and mixing chamber 23 contains a mixing device 24 in the form of a mixing worm. In this case, it is necessary to provide, in addition to the separate ejection of the adhesive components, a device for rotating mixing worm 24, and this device may comprise an operating head 27 on the outer end of mixing worm 24. During the bonding operation, and due to simultaneous rotation of mixing worm 24, adhesive is injected into the worm, mixed, and delivered through outlet aperture 25 into the gluing recess 26 on the bonding surface of clip 21. This gluing recess contains the vanes 10 in the same manner as does the embodiments of FIGS. 2a–2d. After completion of the bonding operation, the mixing chamber 23 with mixing worm 24 is broken of at zone 22, and may be discarded.

Figure 4A:
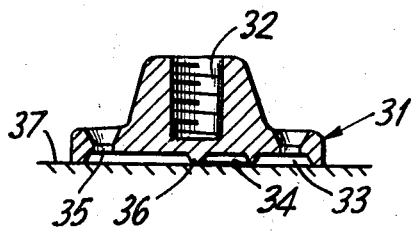
FIGS. 4a, 4b and 4c are, respectively, sectional, top plan and bottom plan views of a fastening element embodying the invention and formed with a thread.
Figure 4B:
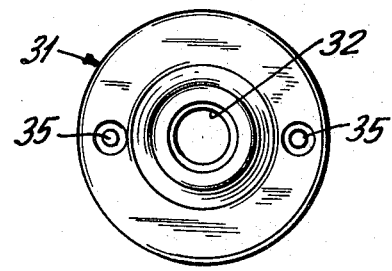
Figure 4C:
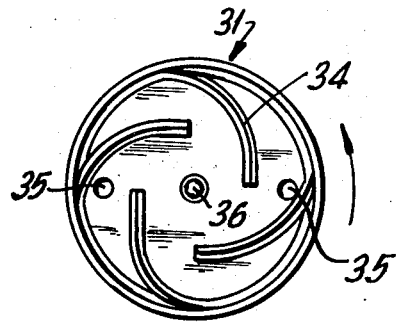

In FIGS. 4a–4c, the fastening element is generally similar to that shown in FIGS. 1a–1c, and comprises a base body 31 formed with a central threaded aperture 32. Mixing of the adhesive components, in this case, occurs directly in the gluing recess 33 formed in the bonding surface of base body 31. For this purpose, mixing strips or vanes 34 are arranged within the gluing recess 33 and, upon rotation of the entire fastening element, provide for the mixing of the adhesive components. During the bonding operation, the two adhesive components are injected through the inlet apertures 35 while base body 31 is being rotated, and enter into the gluing recess 33. Due to the rotation as well as to the form of mixing strips 34, mixing of the adhesive components is effected. To center the rotary movement, a centering point 36 is provided which, upon rotation of base body 31, penetrates slightly into the support surface 38 and prevents slipping of the fastening element during the bonding operation.

Figure 5:
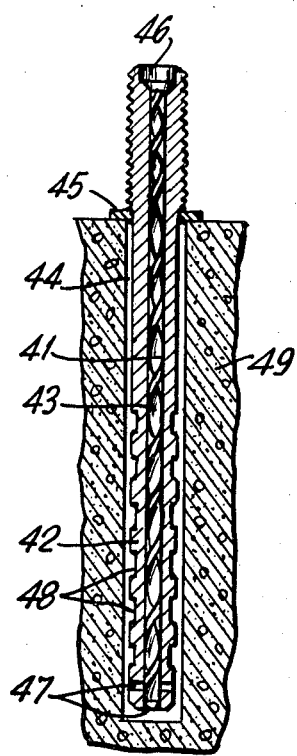
FIG. 5 is a longitudinal sectional view of a threaded dowel embodying the invention.

FIG. 5 illustrates a threaded dowel which is anchored in a pre-drilled aperture by an adhesive bond. This threaded dowel 42 has an axial bore 41 in which there is a mixing element in the form of a spiral 43. For bonding, dowel 42 is introduced into the pre-drilled bore 44 of a support 49, a rollar 45 limiting the depth of insertion as well as closing the pre-drilled bore 44. Following this, the adhesive is injected by a suitable device into the inlet aperture 46 and mixed by means of the appropriately formed mixing elements 43 as it flows through the axial bore 41. The mixed components then issue at the outlet apertures 47 to fill the gluing reces 44 between the inner surface of the bore and the dowel 41. For better anchoring the adhesive, dowel 42 may be formed with grooves 48 on its exterior surface.

Figure 6:
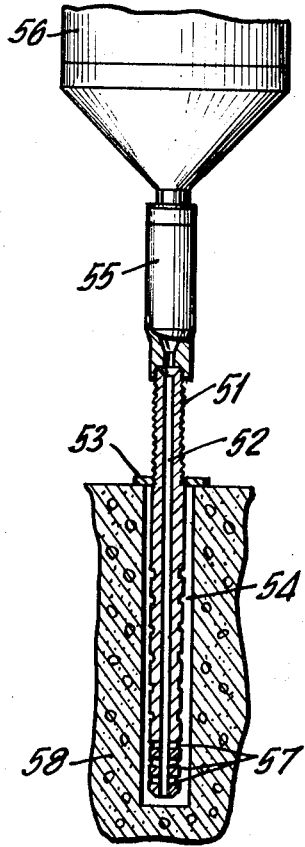
FIG. 6 is a longitudinal sectional view of another form of dowel embodying the invention and having a mixing chamber connected thereto.
Figure 7:
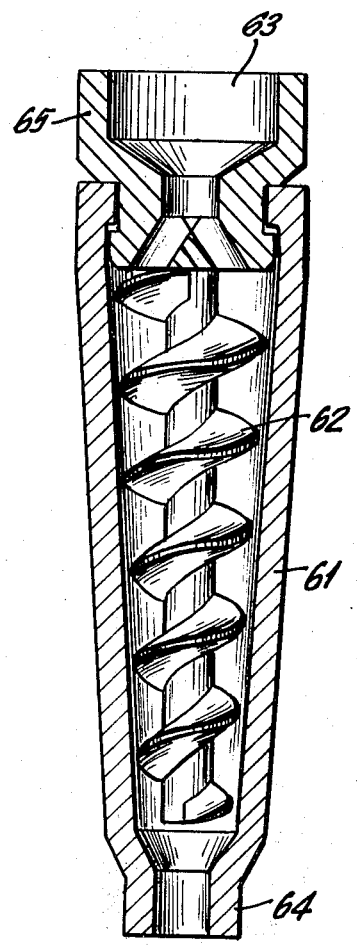
FIG. 7 is a longitudinal sectional view illustrating one form of mixing chamber embodying the invention and provided with a mixing element.

FIG. 6 illustrates another form of dowel arranged to be bonded and provided with a movable mixing element, such as shown in FIG. 7. In this case, a threaded dowel 51 is formed with an axial bore 52 and a collar 53, and is inserted into the pre-drilled bore 54 of a support 58. Collar 53 limits the depth of introduction of dowel 51 and furthermore serves to seal off the pre-drilled bore 54. Following this, adhesive is injected from a device 56 through a mixing element 55 and into the axial bore 52 of dowel 51, and is ejected from outlet aperture 57 into the gluing recess 54.

Figure 2A:
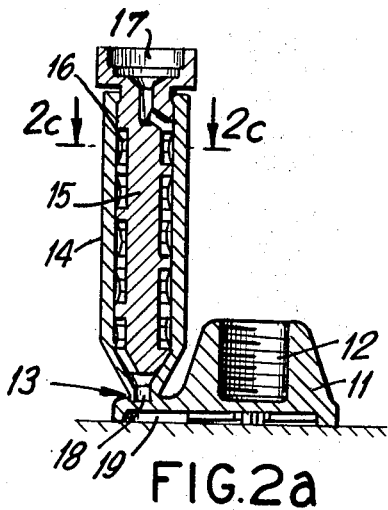
FIG. 2a is a sectional view through a fastening element and associated mixing chamber embodying the invention.
Figure 2B:
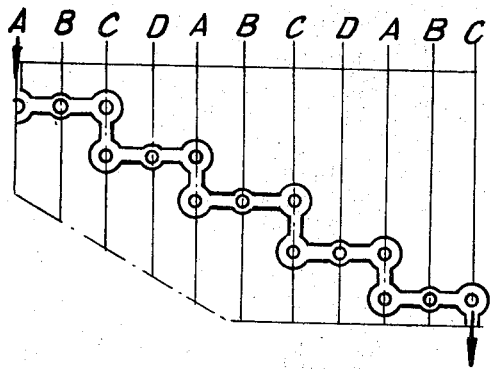
Figure 2C:
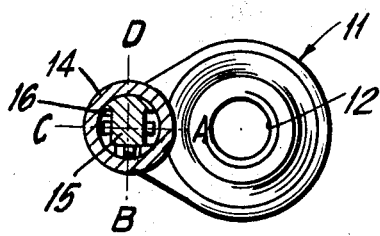
Figure 2D:
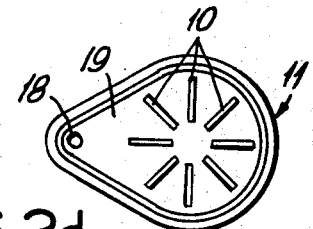
Figure 3A:
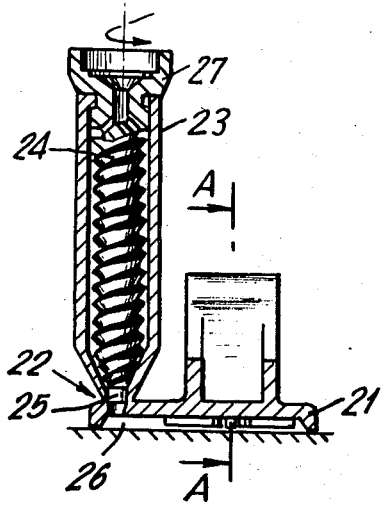
FIG. 3a is a sectional view of a fastening element embodying the invention and designed as a cable clip.
Figure 3B:
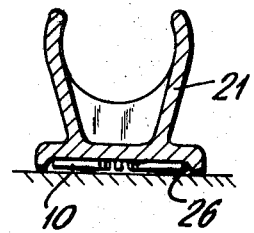
Figure 3C:
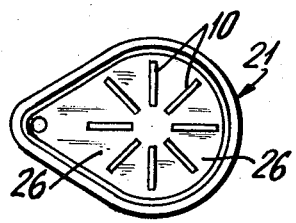

FIG. 7 illustrates a mixing element having a movable part, and which is formed in a manner analogous to the mixing chamber shown in FIGS. 2a and 3a. Since, for manufacturing and price reasons, the mixing elements should be formed cheaply of plastic, it is possible, using the mixing elements, to bond fastening elements of a different material such as, for example, metal. These mixing elements can be used successively for a series of bonds. If the reaction times of the adhesive are so adjusted that the pot time is in excess of the time intervals between individual bonding operations, the same mixing element can be used for the entire series of bonds since, before the start of the reaction, fresh adhesive is always passed through the mixing element.

While the mixing element shown in FIG. 2a effects mixing in a maze-type passage, or while the mixing element may be a mixing worm, in FIG. 7 the mixing element is also a mixing worm 62 positioned in a frustoconical mixing chamber 61 for rotation therein. An inlet aperture 63 is provided in an operating end 65 of worm 62 to receive the nozzle of an adhesive sprayer or injector. 64 represents a weakended zone for attachment of the fastening element to the mixing element.

As a rule, a bonded joint comprises three parts, including a support, a fastening element and a layer of adhesive therebetween. The total strength of the bond corresponds to the weakest part thereof and, in accordance with the selection of particular base materials, the critical strength is shifted to the weakest part. When bonding steel to steel, the adhesive layer between the two parts will represent the weakest zone while, for example, in bonding steel to concrete, the weakest zone is shifted into the concrete. Since precise attachments to concrete are of particular interest, inasmuch as, in many cases, an anchoring by usual methods is undesirable or not permissible, such as in the case of prestressed concrete, and, on the other hand, high strength attachments are to be formed on such structural elements, the invention includes the arrangement shown in FIGS. 12a and 12b. In this arrangement, a substantially conical depression is made in support 71, although the depression may have another form. A fastening element 72, having a formation corresponding to that of the depression, is bonded into the depression. The bonding per se is performed by any one of the described methods and, in the particular illustration of FIGS. 12a and 12b, by injection of the already mixed components through injection passage 73 into bonding or gluing recesses 74. As will be apparent from FIGS. 12 a and 12b, the fastening element 72 has an outer surface substantially flush with that of the support 71, so that further assembly in the usual manner is possible. The advantages of this arrangement are the favorable position of the point of engagement of the loading forces, the enlargement of the bonding area and the displacement of the bond from the surface of the support into the interior of the support.

Figure 8A:
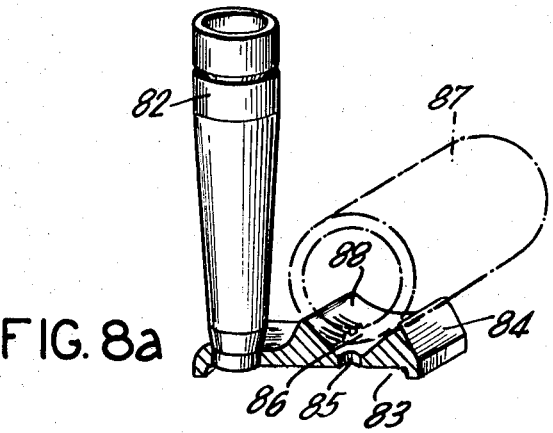
FIGS. 8a, 8b and 8c are, respectively, perspective-sectional, elevation-sectional and bottom plan views of an assembly in accordance with the invention and which involves two assembly operations normally performed separately.
Figure 8B:
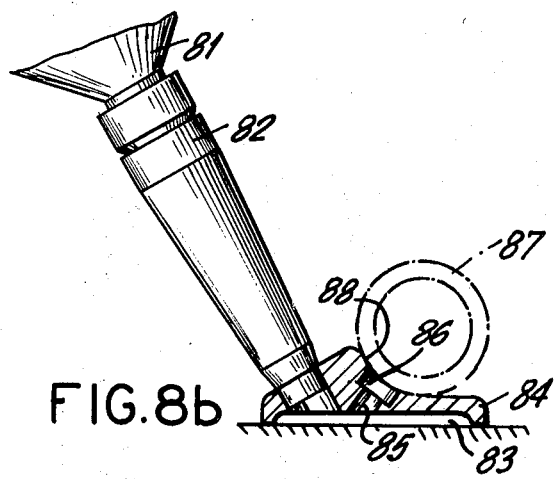
Figure 8C:
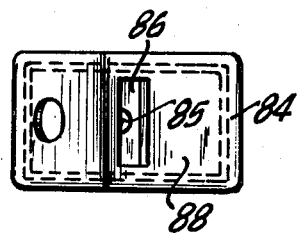

FIGS. 8a–8c illustrate the application of the principles of the invention to a bonding operation involving two bonded joints and which normally are formed separately. By way of example, the bonding is shown as applied for bonding a pipe. In accordance with the hitherto customary method, a clip, or rather the bottom surface thereof, is bonded to a support, and then the pipe is bonded to the clip. However, in accordance with the present invention, adhesive is ejected from a spray device 81 through a mixing element 82 into the bonding recess 83 of a fastening element 84. Through an aperture 85, the adhesive flows on into a groove 86 and simultaneously bonds a pipe 87 resting in a trough-shaped support 88 on fastening element 84. Thus, two bonds are formed at the same time.

For performing the invention method, devices are required which are so adapted that the individual adhesive components can be injected into the mixing element with the necessary pressure through separate nozzle apertures and in the correct mutual mixture ratio and preferably also proportioned. For easy and clean handling of these devices, charging with adhesive is effected using specially designed cartridges. These cartridges comprise generally tubular casings, preferably having a cylindrical cross section, and having an end somewhat recessed to receive a pressure piston. When using a suitable elastic material such as, for example, polyethylene, the outer wall will turn over in the manner of a cuff as the pressure piston is being pushed in, and the cartridge will thus be emptied.

Figure 9A:
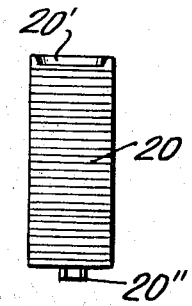
FIG. 9a is an elevation view of an adhesive component containing cartridge in accordance with the invention.
Figure 9B:
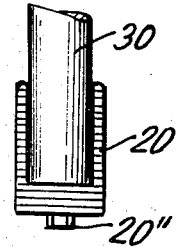
FIG. 9b is a sectional view illustrating the cartridge of FIG. 9a as compressed by a piston.

FIG. 9a illustrates such a cartridge 20 filled with adhesive and having a recessed end 20' and a nipple 20". In FIG. 9b, cartridge 20 is illustrated as partially collapsed by a piston 30 to eject an adhesive component from the cartridge through nipple 20". The cartridge is illustrated as partially emptied.

Figure 10B:
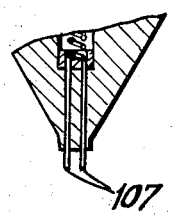

FIGS. 10a and 10b illustrate a simple, manually operated device for injecting adhesive components into a mixing element. The device shown in these figures comprises a relatively elongated body 91 formed with two cylindrical chambers 90 for receiving cartridges 92, these chambers being adjacent the front or discharge end of body 91. Near the rear end of body 91, there is positioned a yolk plate 93 having secured thereto axially displaceable pistons 94 each engageable with a respective cartridge 92. A shank 95 with a handle 96 is provided for axially displacing yolk 93 and pistons 94, and the rear portion of body 91 is closed by a threaded cover 97.

The front closure of body 91 is provided by a nozzle body 98 connected to body 91 by a cap nut 99. Communication between cartridge nipples or outlets 100 and nozzle mouthpieces 101 is effected by passages 102. Closure of the nozzles is effected by a slide 103 which, when the device is idle, is held in closed position by a spring loaded common piston 104.

During use of the device, the latter is placed on the fastening or mixing element and, at the same time, the two feelers 106, and thus piston 104, are pushed back, counter to the spring bias, until tip 105 engages the support surface. As piston 104 is connected with the two slides 103, these are pulled rearwardly and communication is established from passages 102 to the nozzle mouthpieces 101. As handle 96 is pressed inwardly, pressure pistons 94 conjointly engage the ends of cartridges 92 and thus eject the adhesive components in the correct mixture ratios through the channels 102 and the nozzle mouthpieces 101. After bonding, the device is removed and the two feelers 106, as seen in FIG. 10b, are again released so that the spring-loaded piston 104 operates slides 103 to close the nozzle. After the adhesive components have been used up and cap nut 99 has been disengaged from nozzle body 98, the empty cartridges can be removed, the pressure pistons 94 withdrawn, fresh cartridges inserted, and the device re-closed.

FIGS. 11a–11c show a device generally similar to that shown in FIG. 10a but in which there occurs, simultaneously with the injection of the adhesive components, a rotation which has the function of carrying out a rotary movement while the mixing elements are rotating. With the design shown in FIGS. 11a–11c, shank 111 is clamped into the chuck of a drill to obtain the rotary movement The pusher rod 113 is axially guided in cover 112 of the device, for example, by virtue of mating polygonal cross sections of rod 113 and its guiding aperture. Rod 113 is rigidly connected with yolk plate 114 so as to transmit rotary movement to the entire device. Only guide sleeve 115 is stationary when, for the purpose of better conduction, it is used as a manual mounting support. The spraying operation occurs in a manner analogous to that described with reference to FIGS. 10a and 10b, as there occurs, besides the rotary movement, a corresponding application of force on the drilling machine effecting an axial movement for the purpose of ejecting the adhesive components.

What is claimed is:

1. An adhesive fastener for attaching an object to a substantially plane surface said fastener comprising a body including means for mechanically attaching an external object thereto, said body having an external surface including a recess, said recess having interior surfaces adapted to form a chamber with a supporting surface when said fastener is in contact with said supporting surface in a position of normal use, said fastener having attached thereto means adapted to inject a multi-component adhesive into said chamber and thereby adhere said fastener to said supporting surface.

2. The element as claimed in claim 1, in which said second said means includes a mixing zone comprising a mixing chamber communicating with an aperture for injecting adhesive into said first mentioned chamber.

3. The element as claimed in claim 2, in which said mixing chamber defines a labyrinth mixing passage.

4. The element as claimed in claim 2, in which said mixing chamber is detachably connected with said element to be bonded.

5. The element as claimed in claim 1, including a rotatable mixing element positioned in a mixing chamber.

6. The element as claimed in claim 5 in which said rotatable element is a mixing worm structure.

References Cited

UNITED STATES PATENTS

| | | | |
|---|---|---|---|
| 2,092,341 | 9/1937 | deVires | 52—744 XR |
| 2,814,827 | 12/1957 | Snow et al. | 222—390 XR |
| 3,087,606 | 4/1963 | Bollmeier et al. | 206—47 |
| 3,117,696 | 1/1964 | Herman et al. | 222—145 XR |
| 3,144,966 | 8/1964 | Cook | 222—145 XR |
| 3,159,313 | 12/1964 | Sciver | 222—145 XR |
| 3,183,560 | 5/1965 | Brichard | 156—107 XR |
| 3,187,951 | 6/1965 | Hardeman et al. | 222—145 XR |
| 3,195,778 | 7/1965 | Coates | 222—190 XR |
| 3,223,083 | 12/1965 | Cobey. | |
| 3,225,760 | 12/1965 | Di Cosola | 222—145 XR |

OTHER REFERENCES

Glassstone, Textbook of Physical Chemistry, d. Van Nostrand (1946), pp. 499 and 1087 relied on.

Treyball, Mass Transfer Operations, McGraw-Hill (1955), pp. 23–26 and 31 relied on.

JOHN T. GOOLKASIAN, Primary Examiner

WILLARD E. HOAG, Assistant Examiner

U.S. Cl. X.R.

52—744; 65—32; 156—242, 575, 578; 222—190; 248—467